(12) United States Patent
Baek et al.

(10) Patent No.: US 11,811,445 B2
(45) Date of Patent: Nov. 7, 2023

(54) PORTABLE TERMINAL COVER FOR SUPPORTING UWB COMMUNICATION

(71) Applicant: AMOTECH CO., LTD., Incheon (KR)

(72) Inventors: Hyungil Baek, Yongin-si (KR); Kyunghyun Ryu, Seoul (KR); Jaeil Park, Hwaseong-si (KR); Semin Oh, Suwon-si (KR); Yonggil Jo, Goyang-si (KR)

(73) Assignee: AMOTECH CO., LTD., Incheon (KR)

( * ) Notice: Subject to any disclaimer, the term of this patent is extended or adjusted under 35 U.S.C. 154(b) by 301 days.

(21) Appl. No.: 17/273,281

(22) PCT Filed: Aug. 13, 2019

(86) PCT No.: PCT/KR2019/010269
§ 371 (c)(1),
(2) Date: Mar. 3, 2021

(87) PCT Pub. No.: WO2020/050511
PCT Pub. Date: Mar. 12, 2020

(65) Prior Publication Data
US 2021/0320681 A1  Oct. 14, 2021

(30) Foreign Application Priority Data

Sep. 3, 2018  (KR) .................. 10-2018-0104840

(51) Int. Cl.
*H04B 1/3888* (2015.01)
*H01Q 5/25* (2015.01)
*H02J 50/00* (2016.01)

(52) U.S. Cl.
CPC ............. *H04B 1/3888* (2013.01); *H01Q 5/25* (2015.01); *H02J 50/00* (2016.02)

(58) Field of Classification Search
CPC ........ H04B 1/3888; H04B 5/00; H04B 17/27; H04B 5/0037; H01Q 5/25; H02J 50/00;
(Continued)

(56) References Cited

U.S. PATENT DOCUMENTS 10,164,439 B2  12/2018  Jeong
2002/0175876 A1  11/2002  Schantz
(Continued)

FOREIGN PATENT DOCUMENTS

KR  10-2015-0116417  10/2015
KR  10-2016-0004538  1/2016
(Continued)

OTHER PUBLICATIONS

International Search Report and Written Opinion dated Dec. 3, 2020 in International Patent Application No. PCT/KR2019/010269.

*Primary Examiner* — Yuwen Pan
*Assistant Examiner* — Fatuma G Sherif
(74) *Attorney, Agent, or Firm* — INSIGHT LAW GROUP, PLLC; Seung Lee

(57) ABSTRACT

A portable terminal cover fastened to a portable terminal not including a UWB module comprises: a first antenna driven by receiving wireless power through a wireless power transmission with a portable terminal; a second antenna, which is driven by the wireless power supplied from the first antenna so as to measure and receive the location and distance data for an object within a communication range; a third antenna, which is operated by the wireless power supplied from the first antenna so as to transmit the location and distance data, having been measured by the second antenna, to the portable terminal; and a control unit for controlling the first, second and third antennas.

6 Claims, 7 Drawing Sheets

(58) Field of Classification Search
CPC ......... H02J 50/402; H02J 50/80; A45C 11/00; A45C 2011/002
See application file for complete search history.

(56) References Cited

U.S. PATENT DOCUMENTS

2014/0370804 A1* 12/2014 Dorning ............... H04B 5/0037
                                                        455/41.1
2015/0372721 A1* 12/2015 Bard .................... H04B 1/3888
                                                        455/575.8
2017/0005396 A1     1/2017 Aoki et al.
2017/0123045 A1*   5/2017 Shin ..................... G01S 5/0081

FOREIGN PATENT DOCUMENTS

| KR | 10-2017-0054391 | 5/2017 |
| KR | 10-2018-0064740 | 6/2018 |

\* cited by examiner

[FIG. 1]
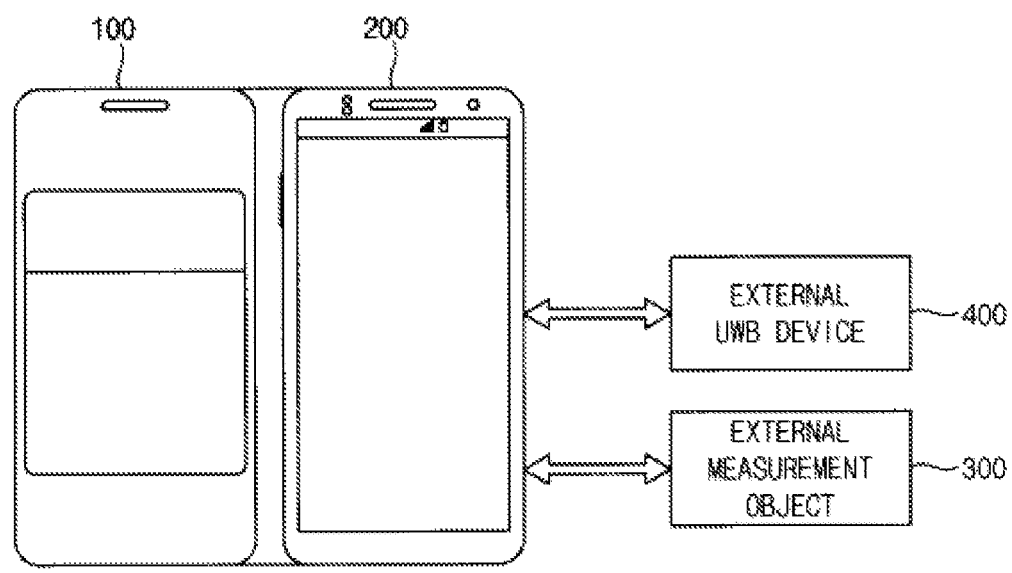

[FIG. 2]
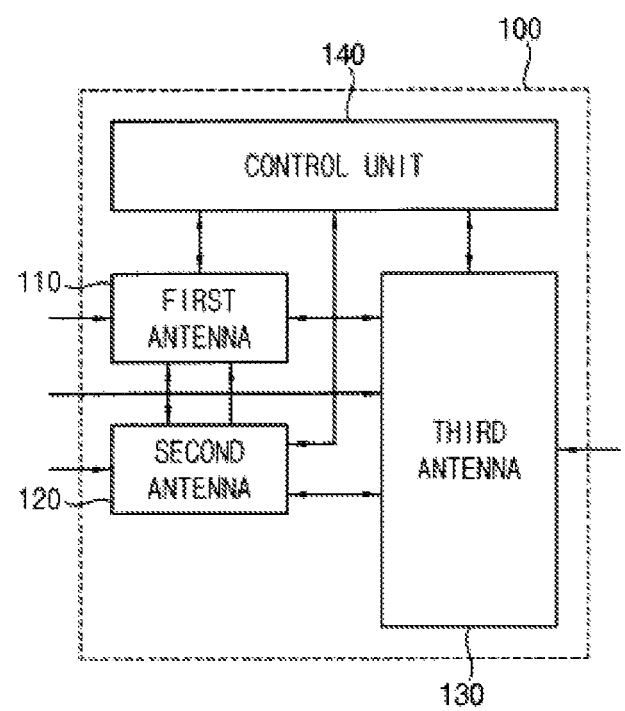

[FIG. 3]
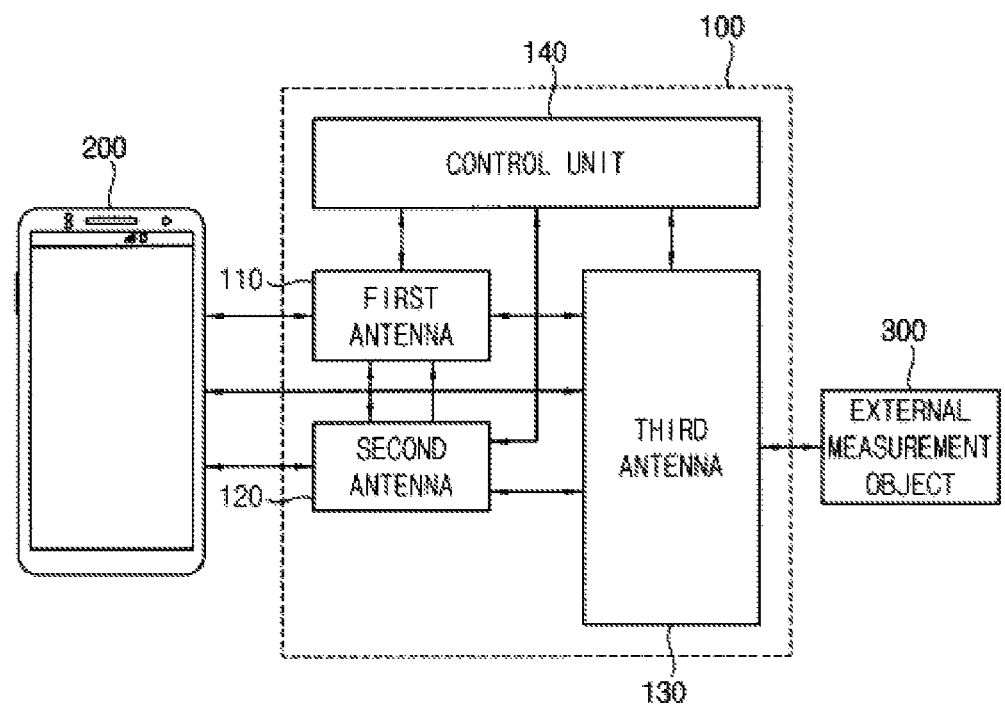

[FIG. 4]
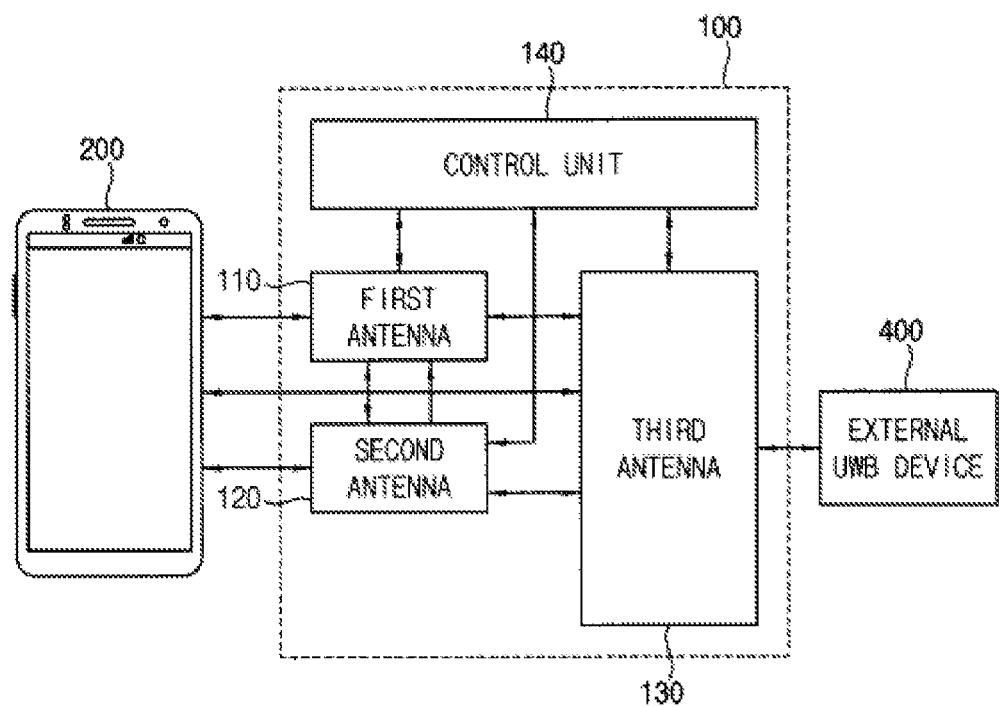

[FIG. 5]
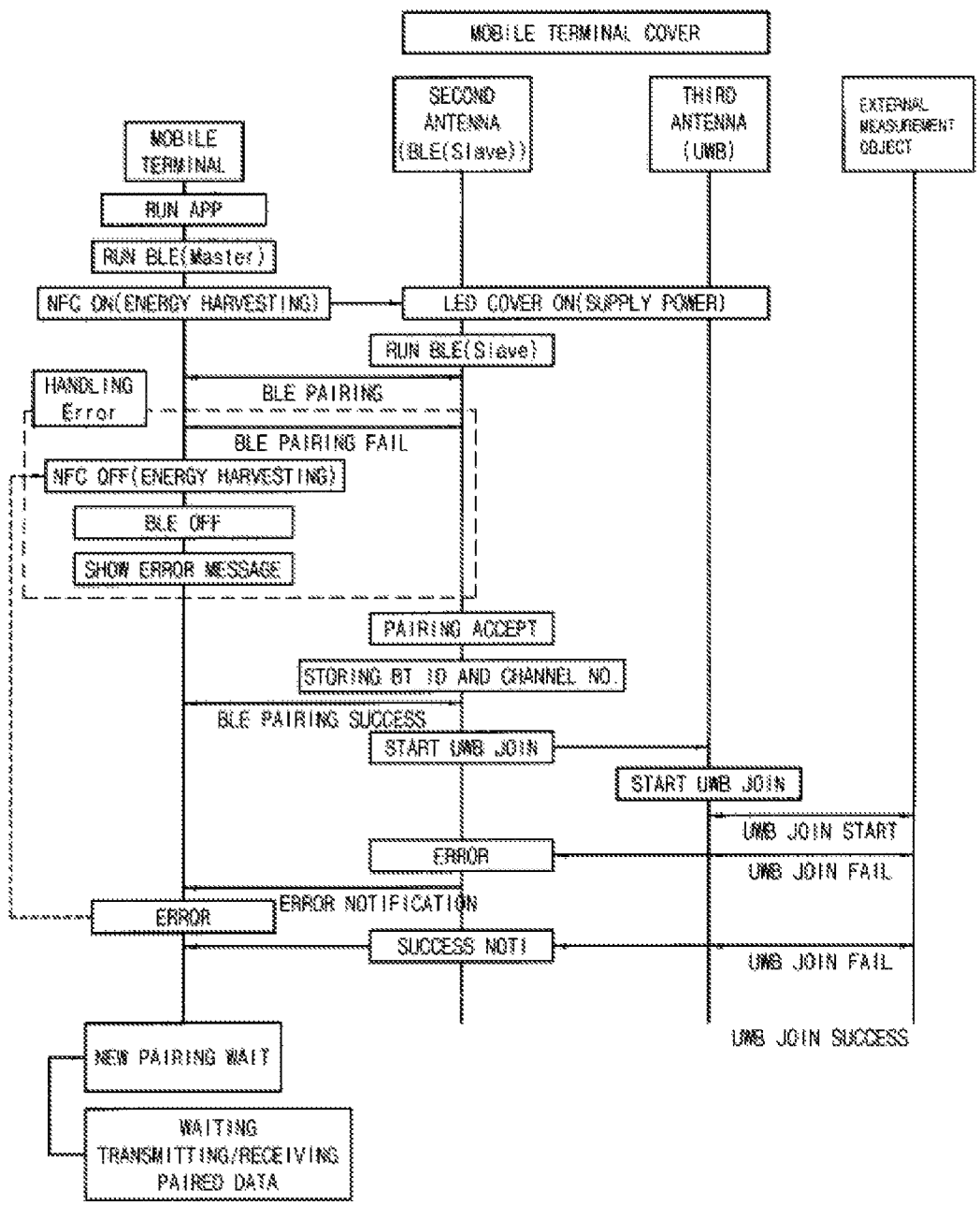

[FIG. 6]
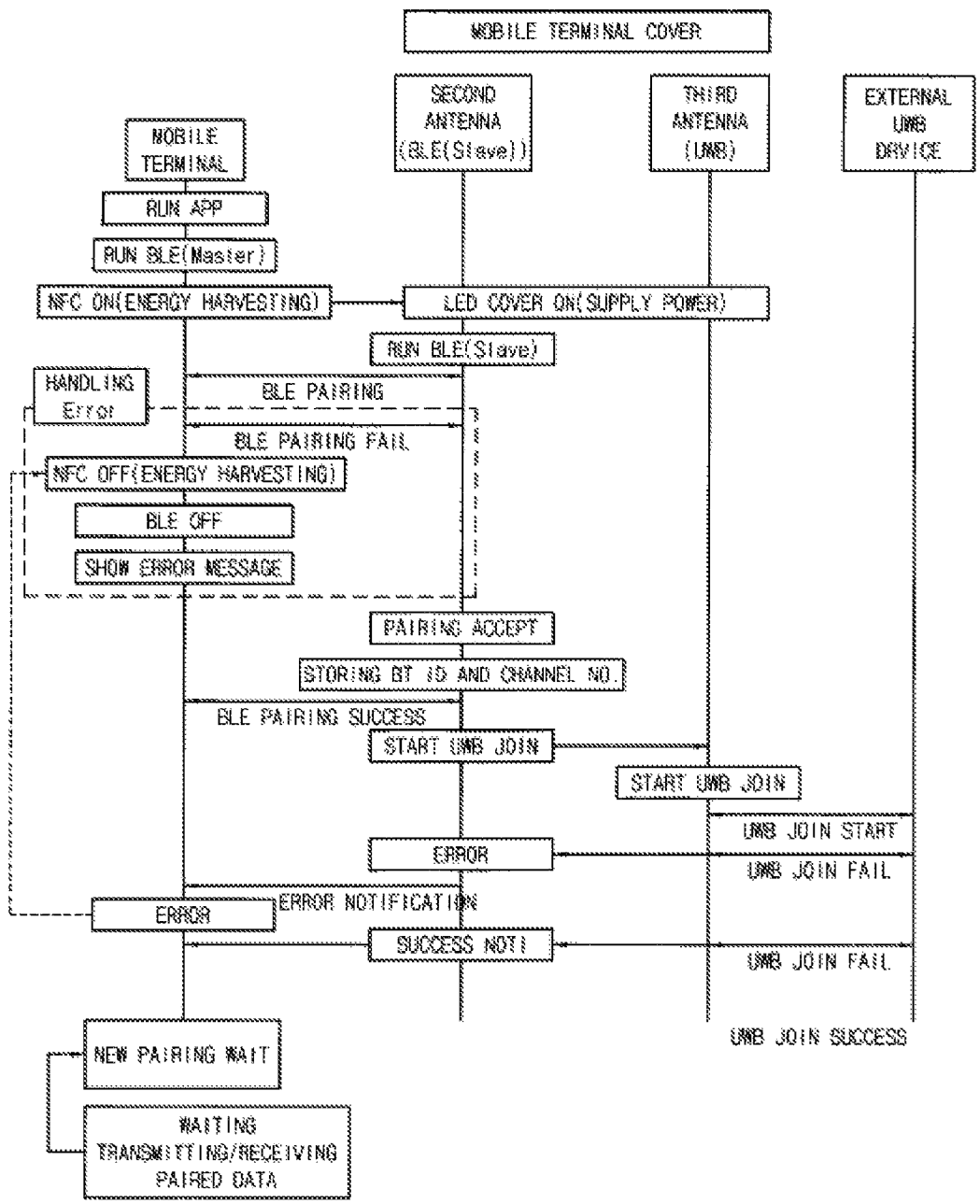

[FIG. 7]
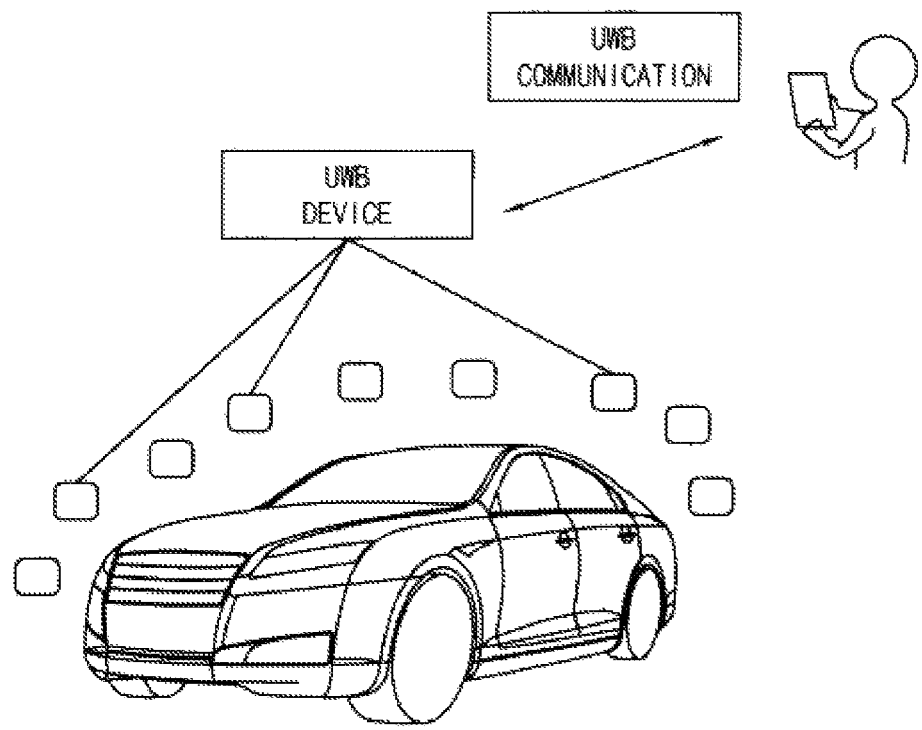

PORTABLE TERMINAL COVER FOR SUPPORTING UWB COMMUNICATION

TECHNICAL FIELD

The present invention relates to a mobile terminal cover, and more particularly, to the mobile terminal cover that is fastened to a mobile terminal and supports an Ultra Wide Band (UWB) communication.

DISCUSSION OF THE RELATED ART

A Ultra Wide Band (UWB) wireless communication system refers to a system that occupies a bandwidth of 20% or more of a center frequency or a wireless transmission technology that occupies a bandwidth of 500 MHz or more to differentiate from narrowband systems and broadband systems described by 3G cellular technology. While the existing wireless technology system, a Bluetooth Low Energy (BLE), uses a specific frequency band of 2.4 GHz and a wireless Local Area Network (LAN) system uses a specific frequency band of 5 GHz, the UWB communication system uses a wide frequency band from 3.1 GHz to 10.6 GHz, which can dramatically solve a problem of lack of frequency.

The UWB communication system is capable of high-speed transmission of 500 Mbps, which is about 10 times that of a wireless LAN that represents a speed of about 54 Mbps. The UWB communication system can accurately measure a location within +/−15 cm, and a distance up to 200M.

Currently, the mobile terminal can track the location of the outdoors by using the Global Positioning System (GPS) system, but can not to track the location of the indoors. The mobile terminal can use communication systems such as BLE and Wireless Fidelity (WIFI), for location tracking of the indoors. However, as described above, there is a need for utilizing the UWB wireless communication system that enables more accurate the location measurement than the existing BLE and WIFI and has high immunity to interference.

In addition, the UWB communication system is expected to increase in need in the future as it enables real-time two-way communication and is strong in security.

SUMMARY

Technical Problem

To solve the above problem and defects, it is an object of the present invention to provide a mobile terminal cover driven by wireless power supplied from a mobile terminal, and performing a location measurement through an Ultra Wide Band (UWB) communication system so that the location measurement for an object within the UWB communication range is performed in the mobile terminal on which a UWB communication module is not mounted.

In addition, another object of the present invention is to provide the mobile terminal cover that allows the mobile terminal on which the UWB communication module is not mounted to communicate with a device on which the UWB communication module is mounted.

Technical Solution

To accomplish the above and other objects of the present invention, there is provided that A mobile terminal cover fastened to a mobile terminal includes a first antenna driven by wireless power supplied from the mobile terminal through wireless power transmission, a second antenna driven by wireless power supplied from the first antenna to transmit a location and distance data with respect to an external measurement object within a UWB communication range to the mobile terminal, a third antenna driven by wireless power supplied from the first antenna to get the location and distance data with respect to the external measurement object within the UWB communication range; and a control unit for controlling the first, second and third antennas.

In an embodiment of the present invention, wherein the first antenna is a near field communication (NFC) antenna, the second antenna is one of a Bluetooth Low Energy (BLE) antenna and a WIFI (Wireless Fidelity) antenna, the third antenna is a UWB antenna, and the first antenna is supplied by wireless power from an NFC antenna mounted on the mobile terminal through wireless power transmission.

In an embodiment of the present invention, wherein the third antenna performs a location and distance measurement with respect to the external measurement object within the UWB communication range.

To accomplish the above and other objects of the present invention, there is provided that
mobile terminal cover fastened to a mobile terminal includes a first antenna driven by
wireless power supplied from the mobile terminal through wireless power transmission, a
second antenna driven by wireless power supplied from the first antenna to transmit/receive
signals to be transmitted/received to the mobile terminal through the third antenna, a third
antenna driven by wireless power supplied from the first antenna and paired with an external
UWB device to transmit/receive signals to the external UWB device; and a control unit for
controlling the first, second and third antennas.

In an embodiment of the present invention, wherein the first antenna is a near field communication (NFC) antenna, the second antenna is one of, a Bluetooth Low Energy (BLE) antenna and WIFI (Wireless Fidelity) antennas, the third antenna is a UWB antenna, and the first antenna is supplied wireless power from the NFC antenna mounted on the mobile terminal through wireless power transmission.

In an embodiment of the present invention, wherein the third antenna communicates the external UWB device within a UWB communication range.\

Advantageous Effects

The effect of the present invention is that the mobile terminal cover is driven by wireless power from supplied from the mobile terminal, so that it can operate without a separate power source.

That is, the mobile terminal cover can operate without a separate power source by using power generated when the NFC function of the mobile terminal is activated through energy harvesting.

In addition, the mobile terminal cover can be densely integrated with various parts, enabling accurate location measurement in the mobile terminal that do not have space to install UWB communication modules. The mobile terminal cover can share the UWB location measurement function with mobile terminal based on a high immunity to multipath and interference and a real-time communication function.

In addition, the mobile terminal cover can perform communication with the external UWB device through the UWB antenna, so that UWB communication and functions are performed for the mobile terminal on which the UWB communication module is not mounted.

BRIEF DESCRIPTION OF THE DRAWINGS

FIGS. 1 to 2 are diagrams showing a mobile terminal cover, according to an exemplary embodiment of the present disclosure.

FIG. 3 is a diagram showing a configuration of the mobile terminal and the mobile terminal cover for a location and distance measurement operation with respect to an external measurement object.

FIG. 4 is diagram showing the configuration of the mobile terminal and the mobile terminal cover for performing UWB communication with an external UWB device.

FIG. 5 is a diagram showing an example of a communication flow between the mobile terminal and the mobile terminal cover for the location and distance measurement operation with respect to the external measurement object.

FIG. 6 is a diagram showing an example of the communication flow between the mobile terminal and the mobile terminal cover for performing UWB communication with the external UWB device.

FIG. 7 is a diagram showing examples of the application of the mobile terminal cover according to an embodiment of the present invention.

DETAILED DESCRIPTION OF THE EMBODIMENTS

Hereinafter, exemplary embodiments of the present disclosure will be described in detail with reference to the accompanying drawings, which will be readily apparent to those skilled in the art to which the present disclosure pertains.

The present disclosure may be embodied in many different forms and is not limited to the embodiments described herein. In the drawings, parts not relating to the description are omitted for clarifying the present disclosure, and the same reference numerals are assigned to the same or similar components throughout the specification.

As shown in FIG. 1, a mobile terminal cover 100 according to an embodiment of the present invention may be used to protect a mobile terminal 200. The mobile terminal cover 100 may be fastened to the mobile terminal 200 on which a UWB module is not mounted.

The mobile terminal cover 100 may be driven by wireless power supplied from the mobile terminal 200 through wireless power transmission. The mobile terminal cover 100 may not have a separate power supply and be driven by wireless power supplied from the mobile terminal 200 through the wireless power transmission.

The mobile terminal cover 100 may communicate with the mobile terminal 200 through one of communication modules such as a Near Field Communication (NFC), a Bluetooth Low Energy (BLE), and a Wireless Fidelity (WIFI), depending on an available antenna.

The mobile terminal cover 100 may transmit location and distance measurement data for an external measurement object 300 within an UWB communication range to the mobile terminal 200 on which an UWB communication module is not mounted.

The mobile terminal cover 100 may serve as a gateway between the mobile terminal 200 on which the UWB communication module is not mounted and the external UWB device 400. As an example, the external UWB communication device 400 may be a device capable of UWB communication with the mounted the UWB module.

As shown in FIG. 2, the mobile terminal cover 100 according to an embodiment of the present invention may include a first antenna 110, a second antenna 120, a third antenna 130, and a control unit 140.

The first antenna 110 may be driven by wireless power supplied from the mobile terminal 200 through wireless power transmission, and may also receive a data signal from the mobile terminal 200. As an example, the first antenna 110 may be an NFC antenna capable of the wireless power transmission and short-range communication.

The first antenna 110 may be supplied wireless power from the mobile terminal 200. The first antenna 110 may be supplied wireless power from the mobile terminal 200 through energy harvesting using wireless power transmission. As an example, the first antenna 110 may be supplied wireless power from the NFC antenna mounted on the mobile terminal 200 through wireless power transmission. The first antenna 110 may be supplied wireless power from the mobile terminal 200 through the wireless power transmission performed in either a magnetic resonance method or a magnetic induction method.

The first antenna 110 may supply power supplied from the mobile terminal 200 to the second antenna 120, the third antenna 130, and the control unit 140 through the wireless power transmission.

The second antenna 120 may be supplied wireless power from the first antenna 110. The second antenna 120 may transmit a signal from the mobile terminal 200 to the third antenna 130 or may transmit a signal from the third antenna 130 to the mobile terminal 200.

Since the power supplied from the first antenna 110 is lower than the power supplied from the mobile terminal 200, the second antenna may be configured as a short-range communication antenna for less power consumption. As an example, the second antenna may be a BLE antenna capable of operating at low power. In addition, the second antenna may be a WI-FI antenna capable of transmitting and receiving data to/from the mobile terminal.

The third antenna 130 may be supplied wireless power from the first antenna 110. The third antenna 130 may be the UWB antenna and may get data by measuring the location and distance of an external measurement object 300 within the UWB communication range.

The third antenna 130 may exchange data by performing RF pairing with an external UWB device.

The control unit 140 may set the communication antenna for each step to drive the mobile terminal cover 100. That is, the control unit 140 may set as the first antenna 110 to receive power from the mobile terminal 200. The control unit 140 may be set as the third antenna 130 to get the data measured the location and distance of the object within the UWB communication range. The control unit 140 may be set as the second antenna 120 to receive/transmit the signal from/to the mobile terminal.

The control unit 140 may control a power supply to an antenna set as a communication antenna. When the first antenna 110 is set as a communication antenna, the control unit 140 may control the first antenna 110 to stop supplying power to the second antenna 120 and the third antenna 130. When the second antenna 120 is set as a communication antenna, the control unit 140 may control the first antenna 110 to stop supplying power to the third antenna 130.

FIG. 3 is a view showing the configuration of the mobile terminal 200 and the mobile terminal cover 100 for the location and distance measurement operation with respect to the external measurement object 300.

The mobile terminal cover 100 may be used to protect the mobile terminal 200. The mobile terminal 200 may not be mounted the UWB module. The mobile terminal cover 100 may be fastened to the mobile terminal 200 on which the UWB module is not mounted.

The mobile terminal cover 100 may receive driving power from the mobile terminal 200 through wireless power transmission. The mobile terminal cover 100 may not have the separate power supply and be driven by power supplied from the mobile terminal 200 through wireless power transmission.

The mobile terminal cover 100 may include the first antenna 110, the second antenna 120, the third antenna 130, and the control unit 140.

The first antenna 110 may be supplied wireless power from the mobile terminal 200 through energy harvesting using wireless power transmission. The first antenna 110 may be supplied wireless power from the NFC antenna mounted on the mobile terminal 200 through the wireless power transmission.

The first antenna 110 may supply wireless power supplied from the mobile terminal 200 to the second antenna 120, the third antenna 130, and the control unit 140 through the wireless power transmission.

The second antenna 120 may be supplied wireless power from the first antenna. The second antenna 120 may transmit the signal from the mobile terminal 200 to the third antenna 130 or transmit the signal from the third antenna 130 to the mobile terminal 200.

The third antenna 130 may be supplied wireless power from the first antenna 110. The third antenna 130 may be the UWB antenna and may get data by measuring the location and distance with respect to the external object within the UWB communication range.

The control unit 140 may set the communication antenna for each step to drive the mobile terminal cover 100. That is, the control unit 140 may set as the first antenna 110 to receive power from the mobile terminal 200. The control unit 140 may be set as the third antenna 130 to get the data measured the location and distance of the object within the UWB communication range. The control unit 140 may be set as the second antenna 120 to receive/transmit the signal from/to the mobile terminal.

FIG. 4 is a diagram showing the configuration of the mobile terminal 200 and the mobile terminal cover 100 for performing UWB communication with the external UWB device.

The mobile terminal 200 may not be mounted the UWB module.

The mobile terminal cover 100 may be used to protect the mobile terminal 200. The mobile terminal cover 100 on which the UWB module is mounted may be fastened to the mobile terminal 200 on which the UWB module is not mounted.

The mobile terminal cover 100 may be supplied driving power from the mobile terminal 200 through wireless power transmission. The mobile terminal cover 100 may not have the separate power supply and be driven by wireless power supplied from the mobile terminal 200 through wireless power transmission.

The mobile terminal cover 100 may communicate with the mobile terminal 200 through one of communication modules such as the NFC, the BLE, and the WIFI, depending on the available antenna.

The mobile terminal cover 100 may serve as the gateway between the mobile terminal 200 on which the UWB module is not mounted and the external UWB device 400. As an example, the external UWB device 400 may be a device capable of UWB communication by mounting the UWB module.

The mobile terminal cover 100 may include the first antenna 110, the second antenna 120, the third antenna 130, and the control unit 140.

The first antenna 110 may be driven by wireless power supplied from the mobile terminal 200 through the wireless power transmission, and also receive the signal from the mobile terminal 200. As an example, the first antenna 110 may be an NFC antenna capable of the wireless power transmission and short-range communication.

The first antenna 110 may supply wireless power supplied from the mobile terminal 200 to the second antenna 120, the third antenna 130, and the control unit 140 through wireless power transmission.

The second antenna 120 may be supplied wireless power from the first antenna. The second antenna 120 may transmit the signal from the mobile terminal 200 to the third antenna 130 or transmit the signal from the third antenna 130 to the mobile terminal 200.

Since the power supplied from the first antenna 110 is lower than the power supplied from the mobile terminal 200, the second antenna may be configured as the short-range communication antenna with less power consumption. As an example, the second antenna may be a BLE antenna capable of operating at low power. In addition, the second antenna may be a WIFI antenna capable of transmitting and receiving data to/from the mobile terminal.

The third antenna 130 may exchange data by performing RF pairing with the external UWB device 400. That is, the external UWB device 400 and the mobile terminal 200 may communicate with each other through the third antenna 130.

The control unit 140 may set the communication antenna for each step to drive the mobile terminal cover 100. That is, the control unit 140 may set as the first antenna 110 to receive power from the mobile terminal 200. The control unit 140 may be set as the third antenna 130 to get the data measured the location and distance of the object within the UWB communication range. The control unit 140 may be set as the second antenna 120 to receive/transmit the signal from/to the mobile terminal.

FIG. 5 may show an example of a communication flow between the mobile terminal 200 and the mobile terminal cover 100 for the location and distance measurement operation with respect to the external measurement object.

When an application program is run, the mobile terminal 200 may activate the short-range communication (BLE) and supply power to the mobile terminal cover 100 through energy harvesting (ie, wireless power transmission).

As power is supplied from the mobile terminal 200 through the first antenna 110, the mobile terminal cover 100 may drive the second antenna 120 to perform Bluetooth pairing with the mobile terminal.

The second antenna 120 may be driven by wireless power supplied from the first antenna 110.

The second antenna 120 may receive a signal such as a location measurement command to be transmitted to the third antenna from the mobile terminal through the application program.

The second antenna 120 may transmit the signal such as the location measurement command from the mobile terminal 200 to the third antenna 130.

The third antenna 130, which has transmitted the signal such as the location measurement command, may measure the location and distance with respect to the external measurement object 300 using UWB communication and get a location and distance measurement data.

The third antenna 130 may transmit the location and distance measurement data to the second antenna 120.

The second antenna 120 may transmit the location and distance measurement data received from the third antenna 130 to the mobile terminal 200.

The mobile terminal 200 may check the received location and distance measurement data through the application program.

FIG. 6 may show an example of a communication flow between the mobile terminal 200 and the mobile terminal cover 100 for performing communication with the external UWB device 400.

When the application program is executed, the mobile terminal 200 may activate the short-range communication (BLE) and supply power to the mobile terminal cover 100 through energy harvesting (ie, wireless power transmission).

As power is supplied from the mobile terminal 200 through the first antenna 110, the mobile terminal cover 100 may drive the second antenna to perform Bluetooth pairing with the mobile terminal.

The second antenna 120 may be driven by wireless power supplied through the first antenna 110.

The second antenna 120 may receive a signal such as a location measurement command to be transmitted to the third antenna from the mobile terminal through the application program.

The second antenna 120 may transmit the signal such as the location measurement command from the mobile terminal 200 to the third antenna 130.

The third antenna 130 received the signal may perform the pairing with the external UWB device 400.

The third antenna 130 may perform a running commend received from the mobile terminal on the external UWB device 400 using UWB communication and transmit/receive a resulted data.

The resulted data by performing with the external UWB device 400 may be transmitted to the second antenna 120 through the third antenna 130.

The second antenna 120 may transmit the data received from the third antenna to the mobile terminal.

The received data may be checked through the application program of the mobile terminal 200.

FIG. 7 is a view showing an example of the application of the mobile terminal cover according to an embodiment of the present invention.

It may be used to remotely control a car door, lighting, or trunk from a certain distance using the UWB antenna mounted on the mobile terminal cover through the application program of mobile terminal.

In addition, it may be used to remotely control for parking a vehicle within a certain distance based on the precision of UWB technology by using the UWB antenna mounted on the mobile terminal cover 100.

As described above, the present disclosure has been described with respect to particularly preferred embodiments. However, the present disclosure is not limited to the above embodiments, and it is possible for one who has an ordinary skill in the art to make various modifications and variations, without departing off the spirit of the present disclosure.

LEGEND

100: a portable terminal cover 110: a first antenna
120: a second antenna 130: a third antenna
140: a control unit 200: a terminal cover
300: an external measurement object
400: an external UWB device

What is claimed is:

1. A mobile terminal cover fastened to a mobile terminal comprising:
   a first antenna driven by wireless power supplied from the mobile terminal through wireless power transmission;
   a second antenna driven by wireless power supplied from the first antenna to transmit a location and distance data with respect to an external measurement object within a UWB communication range to the mobile terminal;
   a third antenna driven by wireless power supplied from the first antenna to get the location and distance data with respect to the external measurement object within the UWB communication range; and
   a control unit for controlling the first, second and third antennas,
   wherein the control unit set driving as the first antenna to receive power from the mobile terminal, set driving as the third antenna to get the data measured the location and distance with respect to an external measurement object within the UWB communication range, and set driving as the second antenna to transmit the data to the mobile terminal, and
   wherein when the first antenna is set as a driving antenna, the control unit controls the first antenna to stop supplying power to the second antenna and the third antenna, and when the second antenna is set as a driving antenna, the control unit controls the first antenna to stop supplying power to the third antenna.

2. The mobile terminal cover fastened to the mobile terminal of claim 1, wherein the first antenna is a near field communication (NFC) antenna, the second antenna is one of a Bluetooth Low Energy (BLE) antenna and a WIFI (Wireless Fidelity) antenna, the third antenna is a UWB antenna, and the first antenna is supplied by wireless power from an NFC antenna mounted on the mobile terminal through wireless power transmission.

3. The mobile terminal cover fastened to the mobile terminal of claim 1, wherein the third antenna performs a location and distance measurement with respect to the external measurement object within the UWB communication range.

4. A mobile terminal cover fastened to a mobile terminal comprising:
   a first antenna driven by wireless power supplied from the mobile terminal through wireless power transmission;
   a second antenna driven by wireless power supplied from the first antenna to transmit/receive signals to be transmitted/received to the mobile terminal through the second antenna;
   a third antenna driven by wireless power supplied from the first antenna and paired with an external UWB device to transmit/receive signals to the external UWB device; and
   a control unit for controlling the first, second and third antennas, wherein the control unit set driving as the first antenna to receive power from the mobile terminal, set driving as the third antenna to/from transmit/receive signals to/from the paired external UWB device, and set driving as the second antenna to transmit the signals to the mobile terminal, and wherein when the first antenna is set as a driving antenna, the control unit controls the first antenna to stop supplying power to the second antenna and the third antenna, and when the second antenna is set as a driving antenna, the control unit controls the first antenna to stop supplying power to the third antenna.

5. The mobile terminal cover fastened to the mobile terminal of claim 4, wherein the first antenna is a near field communication (NFC) antenna, the second antenna is one of, a Bluetooth Low Energy (BLE) antenna and WIFI (Wireless Fidelity) antennas, the third antenna is a UWB antenna, and the first antenna is supplied wireless power from the NFC antenna mounted on the mobile terminal through wireless power transmission.

6. The mobile terminal cover fastened to the mobile terminal of claim 4, wherein the third antenna communicates the external UWB device within a UWB communication range.

* * * * *